Jan. 28, 1964     E. W. JOHNSON     3,119,952
PROTECTION UNIT FOR USE WITH ELECTRICAL OR OTHER APPARATUS
Filed May 19, 1961
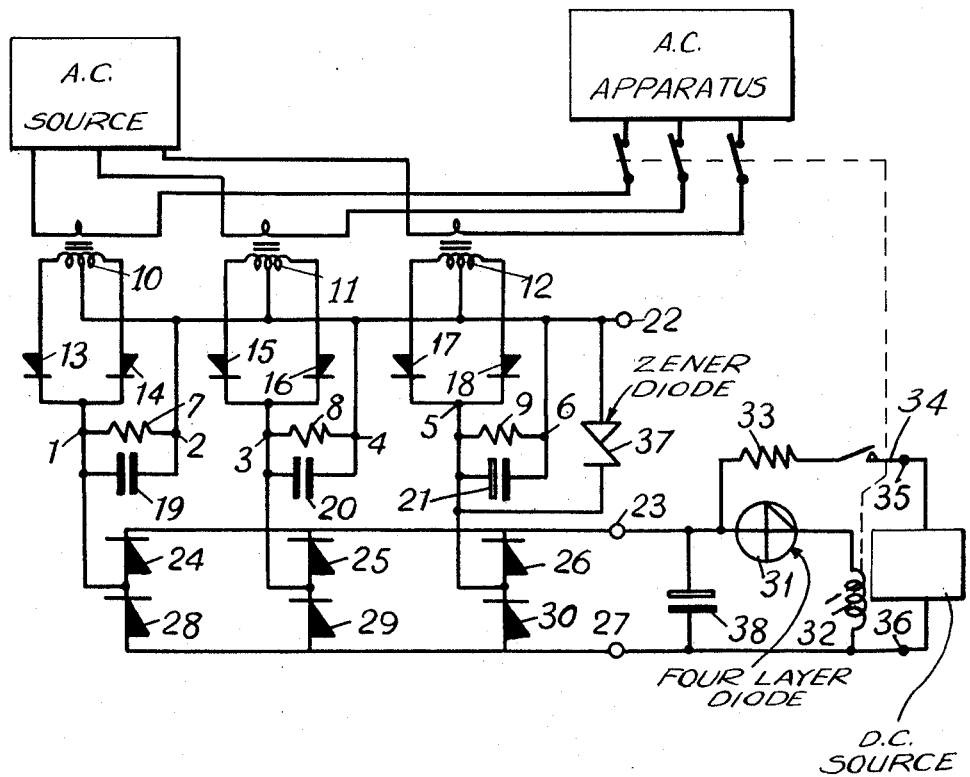

United States Patent Office 3,119,952
Patented Jan. 28, 1964

3,119,952
PROTECTION UNIT FOR USE WITH ELECTRICAL OR OTHER APPARATUS
Edwin William Johnson, Wigginton, England, assignor to Rotax Limited, London, England
Filed May 19, 1961, Ser. No. 111,257
Claims priority, application Great Britain May 23, 1960
4 Claims. (Cl. 317—27)

This invention relates to a protection unit for use with electrical or other apparatus of the kind in which electrical or mechanical conditions at various points in the apparatus can be converted to direct current voltages or alternatively alternating current voltages which are in phase with one another.

A unit in accordance with the invention comprises a plurality of pairs of input terminals adapted for connection to the apparatus in such manner that the voltage signals appearing across each pair of terminals will be equal when the apparatus is operating satisfactorily, a first output terminal connected to one of each pair of input terminals, a second output terminal connected to the other of each pair of input terminals through a plurality of rectifiers respectively which act in a direction to permit current flow from said other input terminals to the second output terminal, a third output terminal connected to said other input terminals through a plurality of rectifiers respectively which act in a direction to prevent current flow from said other input terminals to the third output terminal, and means operable by a predetermined voltage between the second and third output terminals for preventing further operation of the apparatus with which the unit is associated or alternatively for giving a warning that the apparatus is not working satisfactorily.

It will be understood that with a unit as above specified the voltage appearing across the first and second output terminals will be the highest of the voltages across the input terminals, whilst the voltage across the first and third output terminals will be the lowest of the voltages across the input terminals, provided that the first output terminal is connected to the input terminals of negative polarity. If the first output terminal is connected to the input terminals of positive polarity, the highest and lowest conditions will be reversed, but in either case the voltage across the second and third output terminals will be the difference between the highest and lowest input voltages, i.e. zero when the apparatus is working satisfactorily. As a further feature of the invention means may be provided for giving a warning or preventing operation of the apparatus when the highest voltage rises to a predetermined value, and/or when the lowest voltage falls to a predetermined value.

In the accompanying drawing there is illustrated an example of the invention for use with apparatus including a three phase alternating current network.

Referring to the drawing, there are provided three pairs of input terminals, 1, 2; 3, 4; 5, 6; between which are connected three resistors 7, 8, 9 respectively. The terminals 2, 4, 6 are connected respectively to the midpoints of windings 10, 11, 12 coupled magnetically with the phase lines, so that the terminals 2, 4, 6 will be of negative polarity, and the ends of the windings 10, 11, 12 are connected to the terminals 1, 3, 5 respectively through pairs of silicon diodes 13, 14; 15, 16; 17, 18. Furthermore, the resistors 7, 8, 9 are bridged by smoothing capacitors 19, 20, 21 respectively, and it will be understood that when the apparatus is working satisfactorily the voltage across the three pairs of input terminals will be equal and proportional to the average currents in the three phase lines respectively.

There is further provided a first output terminal 22 which is connected to the input terminals 2, 4, 6, and a second output terminal 23 which is connected through three silicon diodes 24, 25, 26 to the terminals 1, 3, 5 respectively, the diodes 24, 25, 26 acting in a direction to permit current flow from the terminals 1, 3, 5 to the terminal 23. Furthermore, a third output terminal 27 is connected to the input terminals 1, 3, 5 through three further silicon diodes 28, 29, 30 respectively which act in a direction to prevent current flow from the terminals 1, 3, 5 to the terminal 7.

With the arrangement so far described, the voltages across the output terminals 22, 23 and the output terminals 22, 27 respectively will be the highest and lowest of the voltages across the input terminals, whilst the voltage across the output terminals 23, 27 will be the difference between these voltages. Thus, when the apparatus is working satisfactorily there will be no voltage across the output terminals 23, 27.

Connected across the terminals 23, 27 is any convenient means whereby further operation of the apparatus will be prevented when the voltage across the terminals 23, 27 reaches a predetermined value. The means conventiently comprises a four layer diode 31 and relay coil 32 which are connected in series across the terminals 23, 27, and are adapted for connection through a resistor 33 and relay contact 34 to a source of supply applied to the terminals 35, 36. The arrangement is such that when the predetermined value of the voltage across the terminals is reached, the diode 31 conducts to energise the relay. The contact 34 now closes to permit a larger current flow through the relay, which is used to prevent further operation of the apparatus in any convenient manner. Further, in order to prevent operation of the means by transient voltages, a capacitor 38 is connected across the terminals 23, 27 to effect a delay.

The unit so far described will afford protection against excessive differences in currents in the phase lines, since the voltages across the pairs of input terminals are proportional to the average currents in the phase lines respectively. In order to afford protection against the current in an line rising to a predetermined value, a Zener diode 37 is connected between the output terminal 22 and the terminal 5, or alternatively terminal 1 or terminal 3. The Zener diode 37 conducts when the current in any phase line rises to the predetermined value, and thereby causes an unbalance and operates the means associated with the terminals 23, 27.

It will be understood that the invention is equally applicable to other electrical or mechanical apparatus provided that suitable voltage signals can be obtained corresponding to conditions at various points in the apparatus. Further, in some instances means may also be provided for preventing further operation of the apparatus when the voltage across the terminals 22, 27 falls to a predetermined value or the voltage across the terminals 22, 23 rises to a predetermined value. Moreover, in some cases in lieu of preventing operation of the apparatus a warning may be given that the apparatus is not working satisfactorily.

Having thus described my invention what I claim as new and desire to secure by Letters Patent is:

1. Means for operating a relay in the event of a fault in a multi-phase A.C. system, comprising in combination a plurality of pairs of input terminals, rectification means connecting the pairs of input terminals to the phases of the A.C. system respectively whereby the voltages developed across the pairs of input terminals are equal when no fault exists in the system, a first output terminal connected to one terminal of each pair of input terminals, second and third output terminals, a first series of rectifiers having their anodes connected respectively to the other terminals of the pairs of input terminals and their cathodes connected to the second output terminal, a second series of rectifiers having their cathodes connected respectively to said other terminals of the pairs of input terminals and their anodes connected to the third output terminal, a Zener diode connected between the first output terminal and one of said other input terminals, and means connected between the second and third terminals for operating said relay when the voltage across the second and third terminals reaches a predetermined value.

2. Means as claimed in claim 1 including a four-layer diode connected in series with the coil of said relay between the second and third terminals, and a D.C. source connected between the second and third terminals in series with a normally open contact operable upon energisation of said relay coil.

3. Means as claimed in claim 2 including a capacitor connected between the second and third terminals, said capacitor preventing operation of the relay by transient voltages.

4. A protection unit for multi-phase A.C. apparatus, comprising in combination a multi-phase A.C. source, a plurality of phase lines connecting the A.C. source to the A.C. apparatus, a plurality of pairs of input terminals, rectification means connecting the pairs of input terminals to said phase lines respectively whereby the voltages developed across the pairs of input terminals are equal when no fault exists in the A.C. apparatus, a first output terminal connected to one terminal of each pair of input terminals, second and third output terminals, a first series of rectifiers having their anodes connected respectively to the other terminals of the pairs of input terminals and their cathodes connected to the second output terminal, a second series of rectifiers having their cathodes connected respectively to said other terminals of the pairs of input terminals and their anodes connected to the third output terminal, a Zener diode connected between the first output terminal and one of said other input terminals, a switching device connected across the second and third terminals and adapted to break down to pass current when the voltage across the second and third terminals reaches a predetermined value, a relay coil in series with said device, said relay coil being energised when said device breaks down, and means operable upon energisation of said relay coil for preventing further operation of said A.C. apparatus.

References Cited in the file of this patent
UNITED STATES PATENTS 1,980,395   Fitzgerald _____ Nov. 13, 1934
2,242,950   Harder _____ May 20, 1941